Inventor:
Glenn F. Couch
By Wilmer Mechlin
his Attorney

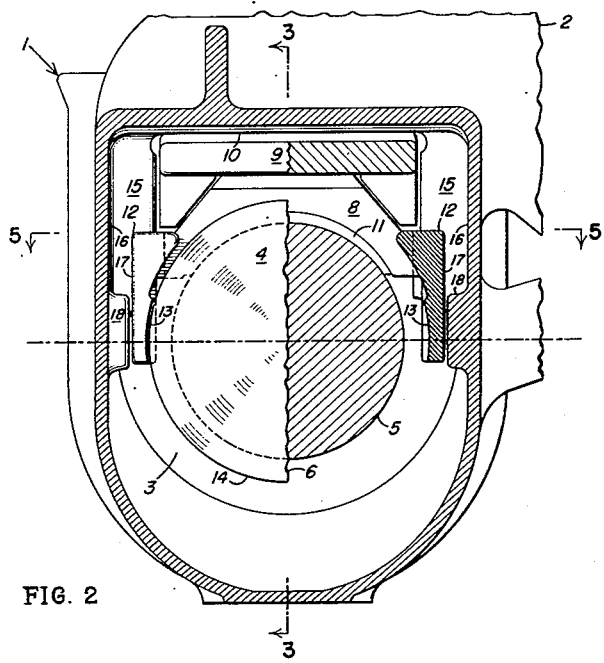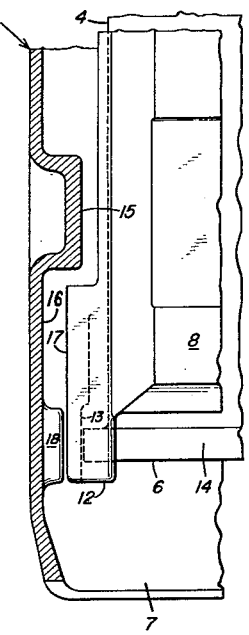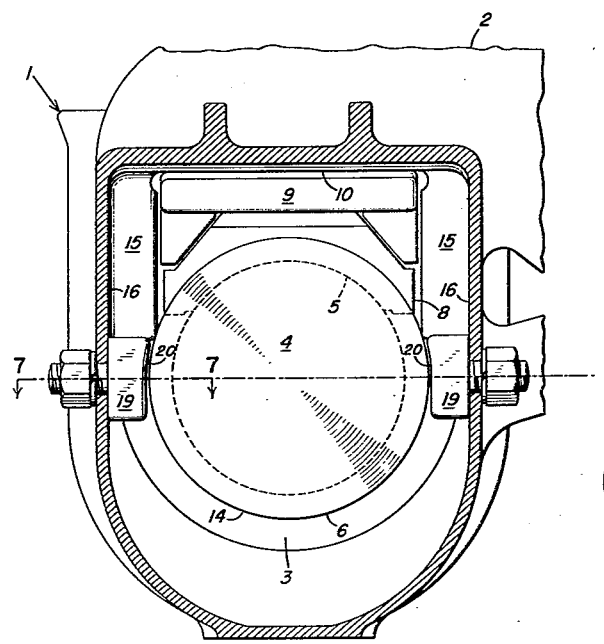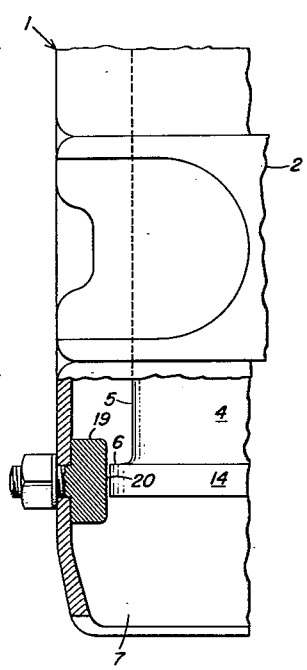

United States Patent Office 2,793,918
Patented May 28, 1957

2,793,918

AXLE STOP FOR JOURNAL BOXES

Glenn F. Couch, Williamsville, N. Y., assignor to Symington-Gould Corporation, Depew, N. Y., a corporation of Maryland Application December 4, 1953, Serial No. 396,172

11 Claims. (Cl. 308—40)

This invention relates generally to journal boxes and more particularly to stops for restricting the lateral movement of axles relative thereto.

It has been found that a main cause of hot boxes is the inability of the bearing to prevent lateral or radial movement of the axle relative to the journal box under severe service conditions, such as sudden brake applications and heavy impacts on coupling. Displaced laterally relative to the journal box under such conditions, the journal of the axle loses its normal surface with the bearing and leave sufficient space therebetween for entry of waste. Any waste entering this space is trapped between the bearing and the journal when the axle returns to normal position, and subjected to excessive friction, with ignition of the waste and a hot box the potential result.

Recognizing the cause, several solutions have been proposed to restrict the permissive lateral horizontal movement of the axle sufficiently to prevent entry of waste between the bearing and the journal. One such has been to incorporate in a dust guard a metal reinforcement so that the dust guard serves, as well, as a stop for restricting lateral movement. Another has been to attach to the inner walls of the journal box at either side of the journal, axle stops which extend substantially the full length of the journal at a tangent to its periphery and depend for preventing hot boxes on both reducing the permissive relative lateral horizontal movement of the axle and on containing the waste within the lower part of the journal box. I have found that if relative lateral displacement of the journal and the bearing can be effectively prevented, it is unnecessary also to contain the waste and that the displacement can be prevented effectively by stops positioned to engage and have surface bearing with the axle end collar.

It is therefore an object of my invention to provide an improved journal box axle stop wherein stops, substantially fixed against lateral movement relative to the journal box, are positioned to engage the axle end collar and restrict its alteral displacement relative to the journal box, thereby effectively maintaining surface engagement between the journal and its bearing.

Another object of the invention is to provide an improved axle stop of the described characteristics which may be fixed, removably or permanently, to the inner side walls of a journal box and, when so fixed, will not interfere with a wheel change or other repair or maintenance operation.

An additional object of the invention is to provide an improved axle stop of the described characteristics, the axle flange-engaging surfaces of which may be made integral with the bearing and the bearing with these surfaces, either alone or backed up by abutments on the journal box, serves effectively to maintain the normal surface contact between bearing and journal.

A further object of the invention is to provide an improved axle stop of the described characteristics wherein the axle collar engaging surfaces of the stops, while adapted for surface engagement with the collar and thus preventing upward, as well as horizontal, lateral displacement of the axle relative to the journal box, are so disposed as to permit free upward movement of the journal box relative to the axle, for jacking or like purposes.

Other objects and advantages of the invention will appear hereinafter in the detailed description, be particularly pointed out in the appended claims, and be illustrated in the accompanying drawings, in which:

Figure 2 is a vertical sectional view, one side of which is taken on lines 2a—2a of Figure 1, and the other on the lines 2b—2b of Figure 1.

Figure 5 is a fragmentary horizontal sectional view taken along the lines 5—5 of Figure 2.

Figure 6 is a vertical sectional view, taken transversely of the journal box, showing in end elevation a second embodiment of the axle stops of the present invention; and Figure 7 is a fragmentary horizontal sectional view taken along the lines 7—7 of Figure 6.

Figures 1, 3, 4:
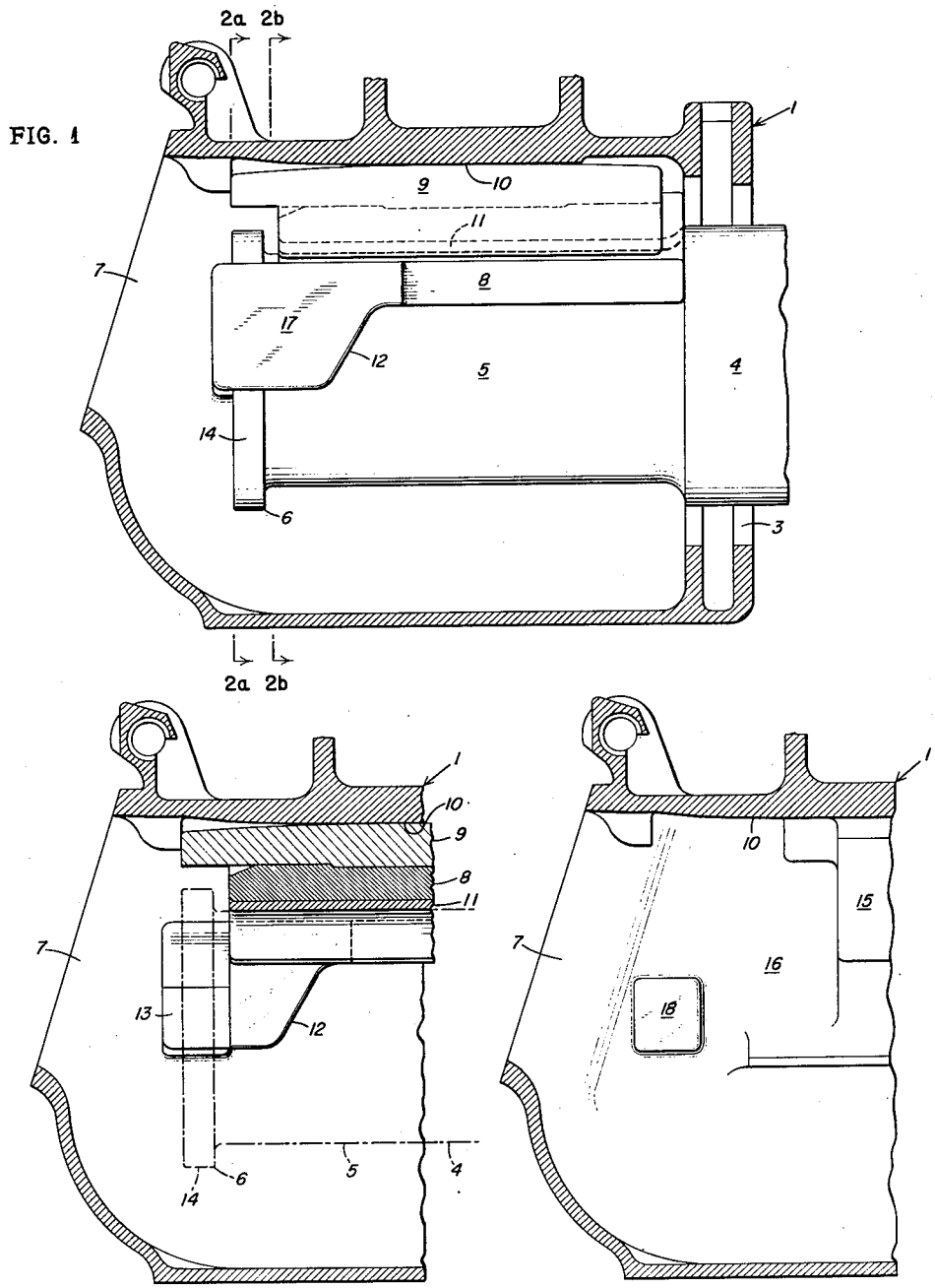
Figure 1 is a side elevational view, with the journal box in section, of one embodiment of the axle stop of the present invention.
Figure 3 is a fragmentary vertical sectional view taken along the lines 3—3 of Figure 2, with the axle in phantom.
Figure 4 is a fragmentary vertical sectional view of the journal box, alone, taken along the same lines as Figure 3.

Referring now in detail to the drawings, in which like reference characters designate like parts, the axle stop of the present invention, while applicable to both separate and integral journal boxes, finds its widest application in integral journal boxes and has been so illustrated in both embodiments, the journal box being designated as 1 and the attached portion of the side frame as 2. The journal box is conventional, except as modified in the manner hereinafter to be described, and into it through the rear, normally dust guard-sealed, opening 3 is inserted a conventional axle 4, the portion of the axle within the journal box having the usual restricted neck or journal 5 and end collar or flange 6, the latter when in position being disposed adjacent the front end of the journal box.

The journal box has the usual front opening 7 which is normally closed by a lid (not shown) and engages and is supported on the axle 4 by a bearing 8, held in place by a wedge 9 inserted between the bearing and the roof 10 of the journal box. Overlying the journal 5 and having the usual cylindrically concave or crowned liner 11, the bearing 8 is conventionally designed to extend substantially the length of the journal and have circumferential contact therewith over an angle of slightly more than 100°. While this angle of overlap between the bearing and the journal is usually adequate to maintain the two members in surface contact, it does not suffice under severe service conditions, such as above mentioned, and it is under such severe conditions that the axle stop of the present invention, now to be described, comes into play.

In the embodiment of Figures 1–5, the axle stop is comprised of a pair of laterally or transversely spaced arms, stops or stop members 12 integral with and made of the same anti-friction material, usually brass, as the bearing 8, the arms projecting or extending forwardly of and below the bearing on either side of the axle 4. Adjacent their forward or outer longitudinal extremities, the arms 12 have a pair of horizontally spaced, confronting or opposed inner surfaces or faces 13 which are aligned laterally with the end collar 6, the surfaces together straddling or embracing the collar and each covering a portion of its periphery 14 bisected by the horizontal mid-plane of the axle in the normal position of the latter, this plane hereinafter being the normal horizontal medial or mid-plane of the axle. The collar-engaging surfaces 13 of the arms 12 thus extend through the normal horizontal mid-plane of the axle and over the upper and lower halves or peripheral surfaces of the collar into which its periphery 14 is divided by that plane. Designed normally to clear the collar 6 but to have surface contact therewith on slight relative lateral movement or displacement of the latter, the engaging surfaces 13 are cylindrically concave and coradial with the collar at least over the upper surface of the collar and preferably over a part of the lower surface, as well. However, it will be noted that the extent of vertical overlap of the engaging surfaces 13 with the lower surface of the collar is limited, so that there is no horizontal overlap with this surface in the normal positions of the axle and the bearing 8, thus permitting the bearing to be withdrawn vertically from the axle on raising of the journal box.

The clearance between the engaging surfaces 13 of the stops 12 and the periphery 14 of the collar 6, while sufficient to enable the axle in normal position to run free of these surfaces, is held at a minimum, so that one or the other of the surfaces 13 will be engaged by the collar almost immediately upon displacement of the axle under severe service conditions. Except over the slight initial clearance, the bearing 8, through its arms 12, therefore is carried by and moves laterally or radially with the axle, thus substantially maintaining surface contact between the journal 5 and the liner 11 and preventing entrance of waste therebetween. This is equally true whether the axle is displaced horizontally or upwardly and throughout its range of axial movement relative to the journal box, the engaging or bearing surfaces 13 not only overlapping the collar laterally but extending axially of the collar sufficiently to include its limits of axial movement.

Although carried laterally with the axle 4 by its arms 12, the bearing 8 is limited in movement laterally of the journal box and held substantially stationary by the wedge 9 and the vertical retaining ribs 15 on the journal box and its lateral movement beyond that limit, consequently, would apply to it a wedging action which would tend to cock it relative to the axle. It is therefore desirable that the arms 12 not only limit the permissive lateral movement between the journal and the axle, but also be utilized to limit the permissive lateral displacement of the bearing. Since the openings 3 and 7 at either end of the journal box are normally narrower than the space between the side walls 16 of the journal box which the arms are designed to occupy, the bearing could not readily be inserted or removed if its arms were sufficiently thick to abut against the side walls. The arms 12 are therefore preferably made of such spread as to be insertible into the journal box and the space between their outer lateral surfaces 17 and the side walls 16 of the journal box is substantially filled by abutments or shoulders 18, removably or, as here, permanently fixed to the side walls, and each positioned to engage one of the arms 12 and back up its bearing surface 13 when the latter is, in turn, engaged by the collar 6.

In the embodiment of the invention shown in Figures 6 and 7, stops or stop members 19, while having the same capabilities of the stop arrangement of the first embodiment, are entirely on the side walls 15 of the journal box 1. Preferably made of bronze or brass, to minimize friction with the axle end collar 6, the stops 19 are in the form of abutments or shoes, each fixed, as by bolting, to one of the side walls 16 at or adjacent its intersection with the normal horizontal mid-plane of the axle and each instand from the associated side wall and toward and opposing the other stop across the horizontal diameter or center plane of the axle. Straddling or embracing the end collar 6, the stops 19 are alterally aligned with it with respect to the longitudinal axes of the journal box and axle and each has a bearing or engaging face or surface 20 confronting the periphery or peripheral surface 14 of the collar and overlapping it axially or longitudinally of the journal box sufficiently to accommodate the range of axial movement of the axle relative to the journal box.

Extending through the normal horizontal midplane of the axle, the bearing surfaces 20, like those of the first embodiment, extend vertically over or span adjacent portions of the upper and lower peripheral surfaces or halves of the collar 6. The bearing surfaces 20 also are designed to have surface bearing with the periphery 14 of the collar and for this purpose, at least those portions of the surfaces above the normal horizontal mid-plane of the axle, are cylindrically concave and coradial with and adapted to conform to the periphery of the collar, these portions being sufficiently extensive to overlap the collar both vertically and horizontally and thus limit upward as well as horizontal movement of the axle relative to the journal box. The lower portion of these surfaces, which overlap the lower half of the collar, may be cylindrically concave, as are the corresponding portions of the bearing surfaces 13 of the first embodiment, but here are shown as planar and substantially parallel to each other, reliance thus being placed on the upper portions of these surfaces to restrict upward and horizontal relative movement of the axle, and the parallel disposition of the lower portions permitting unrestricted downward movement of the axle relative to the journal box for repairs or like purpose.

As in the case of the first embodiment, the clearance between the cylindrically concave surfaces 20 on the stops 19 and the peripheral surface 14 of the collar 6 are held at a minimum, consistent with normal free running of the axle 4 relative thereto, so that slight horizontal or upward displacement of the axle will bring the collar into contact with one or the other of the bearing surfaces. By then preventing further displacement of the axle laterally of the journal box, the bearing surfaces 20 effectively serve to maintain the bearing 8, here conventional, in substantially its normal surface contact with the journal 5 and prevent the entry of waste therebetween.

From the above detailed description it will be apparent that there has been provided an improved stop for restricting movement of the axle upwardly and horizontally relative to the journal box, the stop in one form being substantially fixed and in the other being fixed against movement relative to the journal box, and the stops of both forms acting on and providing surface contact with the periphery of the end collar of the axle. Clearing the end collar laterally below its normal mid-plane, the stops of both forms permit free downward movement of the axle relative to the journal box, this being of particular importance in the second form in which the stops are fixed, and avoiding the necessity of removing either stop when a wheel change or like repair is to be made. It should be understood that the described and disclosed embodiments are merely exemplary of the invention and that all modifications are intended to be included which do not depart either from the spirit of the invention or the scope of the appended claims.

Having described my invention, I claim:

1. In a railway journal box having an axle journaled therein, the combination of horizontally spaced surfaces substantially fixed against movement laterally of said journal box, said surfaces being aligned laterally with an end collar of said axle, each of said surfaces having a portion conforming to and overlapping both horizontally and vertically a part of said collar above and extending substantially to the normal horizontal mid-plane of said axle and said surfaces below said mid-plane being at a greater horizontal spacing than the diameter of said end collar for passage of said end collar vertically therebetween.

2. In a railway journal box having an axle journaled therein, the combination of horizontally spaced surfaces substantially fixed against movement laterally of said journal box, said surfaces being aligned laterally with an end collar of said axle and vertically overlapping upper and lower halves thereof, and said surfaces horizontally overlapping only the upper half of said collar and being adapted to conform thereto for restricting horizontal and upward movement of said axle relative to said journal box.

3. In a railway journal box having an axle journaled therein, the combination of a plurality of stop surfaces within said journal box and substantially fixed against movement laterally thereof, said surfaces being aligned laterally with and disposed on opposite sides of an end collar of said axle and each extending through the normal horizontal mid-plane of said axle, and said surfaces overlapping said collar laterally only above said mid-plane and being adapted to conform to the periphery thereof for restricting upward and horizontal movement of said axle relative to said journal box.

4. In a railway journal box having an axle journaled therein, the combination of a pair of horizontally spaced stop means each fixed to an opposite side wall of said journal box and aligned laterally with an end collar of said axle, and a cylindrically concave surface on each of said stop means and normally spaced from the peripheral surface of said collar and horizontally overlapping only the upper half of said surface, each of said concave surfaces being adapted to engage and have surface contact with said peripheral surface on lateral movement of said collar theretoward for restricting upward and horizontal while allowing downward movement of said axle relative to said journal box.

5. In a railway journal box having an axle journaled therein, the combination of a pair of horizontally spaced stop members each removably fixed to an opposite side of said journal box and confronting an opposite side of and in lateral alignment with an end collar of said axle, and confronting cylindrically concave surfaces on said stop members each normally spaced from and horizontally overlapping only an upper half of said collar, each of said surfaces conforming to and being adapted to have surface contact with said collar on displacement of said collar thereagainst for restricting corresponding lateral movement of said axle relative to said journal box.

6. In a railway journal box having an axle journaled therein, the combination of a pair of spaced stop members removably secured to and instanding from opposite side walls of said journal box, said stop members being aligned laterally with an end collar of said axle, and bearing surfaces on said stop members confronting opposite sides of said collar and each extending through the normal horizontal mid-plane of said axle, said surfaces normally being spaced from the periphery of said collar and horizontally overlapping said collar only above said plane, and each of said surfaces being adapted to conform to and have surface contact with said periphery on movement of said collar thereagainst for restricting upward and horizontal while permitting downward movement of said axle relative to said journal box.

7. In a railway journal box having an axle journaled therein, the combination of a substantially stationary bearing, a pair of horizontally spaced arms rigid with and depending from said bearing and interposed between said axle and sides of said journal box, bearing surfaces on said arms laterally aligned with and confronting opposite sides of an end collar of said axle, said bearing surfaces extending through the normal horizontal mid-plane of said axle and each normally horizontally overlapping the periphery of said collar thereabove, said surfaces normally being spaced from said periphery and each being adapted to engage and have surface contact therewith on movement of said collar thereagainst for restricting upward and horizontal movement of said axle relative to said bearing.

8. In a railway journal box having an axle journaled therein, the combination of a pair of spaced stop members removably secured to and instanding from opposite side walls of said journal box, said stop members being aligned laterally with an end collar of said axle, bearing surfaces on said stop members confronting opposite sides of said collar and each extending through the normal horizontal mid-plane of said axle, said surfaces normally being spaced from the periphery of said collar and horizontally overlapping said periphery only above said plane, each of said surfaces being adapted to conform to and have surface contact with said periphery on movement of said collar thereagainst.

9. In a railway journal box having an axle journaled therein, the combination of a substantially stationary bearing, a pair of laterally spaced arms integral with and depending from said bearing and interposed between said axle and sides of said journal box, and confronting cylindrically concave bearing surfaces on said arms at opposite sides of said axle and conforming to a peripheral portion thereof, each of said bearing surfaces normally being spaced from said peripheral portion and being adapted to engage and have surface contact therewith on movement of said portion thereagainst for restricting horizontal movement of said axle relative to said bearing.

10. In a railway journal box having an axle journaled therein, the combination of a bearing, a pair of laterally spaced arms integral with and projecting forwardly and downwardly of said bearing and interposed between said axle and sides of said journal box, and confronting cylindrically concave bearing surfaces on said arms laterally aligned with and at opposite sides of an end collar of said axle and conforming to the periphery thereof, said bearing surfaces normally being spaced from said periphery and being adapted to engage and have surface contact therewith on movement of said axle relative to said bearing.

11. In a railway journal box having an axle journaled therein between side walls thereof, the combination of a bearing, a pair of laterally spaced arms integral with and projecting forwardly and downwardly of said bearing, cylindrically concave bearing surfaces on said arms at opposite sides of said axle and conforming to the confronted peripheral portion thereof, each of said bearing surfaces normally being spaced from said peripheral portion and being adapted to engage and have surface contact therewith on movement of said portion thereagainst, and means fixed to and instanding from said side walls of said journal box and each backing up one of said bearing surfaces for cooperating therewith to restrict lateral horizontal movement of said axle relative to said journal box.

References Cited in the file of this patent
UNITED STATES PATENTS
1,967,512     Pilcher _____ July 24, 1934